July 5, 1960
B. L. ARCHER
2,943,973
INSECTICIDES FOR USE AS TREE SPRAY
Filed March 26, 1957
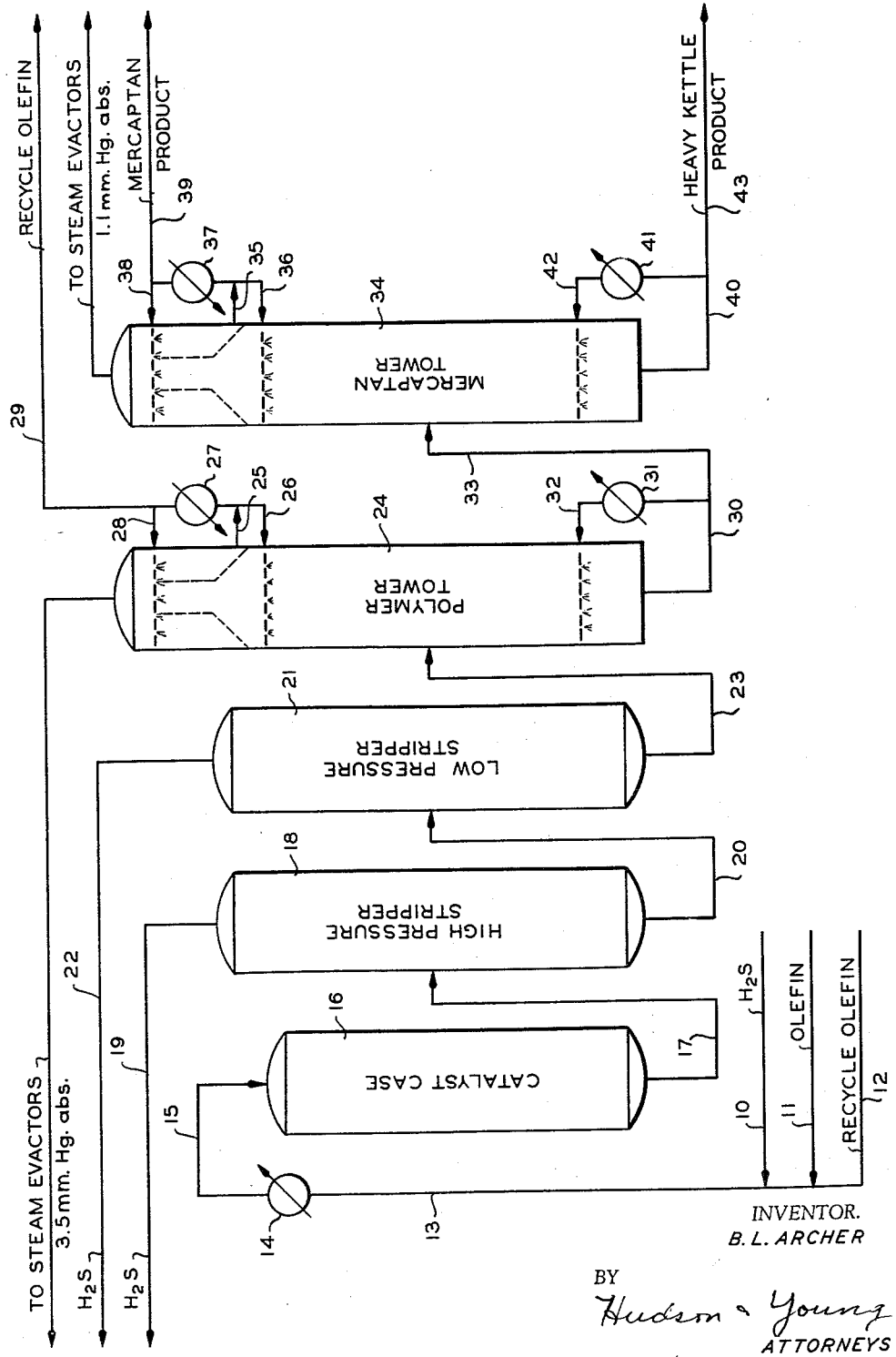
INVENTOR.
B. L. ARCHER
BY
Hudson & Young
ATTORNEYS United States Patent Office 2,943,973
Patented July 5, 1960

2,943,973
INSECTICIDES FOR USE AS TREE SPRAY

Bradford L. Archer, Borger, Tex., assignor to Phillips Petroleum Company, a corporation of Delaware Filed Mar. 26, 1957, Ser. No. 648,710

5 Claims. (Cl. 167—22)

This invention relates to novel pesticidal compositions. More specifically, this invention relates to improvements in the control of insects, fungi, mites, and other plant pests and to improvements in the general effectiveness of pesticidal compositions. In accordance with one aspect, this invention provides improved pesticidal compositions to which have been imparted specific miticidal activity and an improved method for controlling or eliminating mites, such as red spider mites, European red mites, and citrus mites, by way of example. In accordance with another aspect, this invention relates to improved pesticidal compositions containing as the active principal ingredient thereof a normally waste product which results from the production of alkyl mercaptans through the interaction of hydrogen sulfide and selected olefins in the presence of a solid contact catalyst. In accordance with a more specific aspect, this invention relates to improved pesticidal compositions for use as a plant spray containing as the active principal ingredient thereof the kettle product which results from the production of high-boiling alkyl mercaptans through the interaction of hydrogen sulfide and selected olefins in the presence of a solid contact catalyst.

One of the major defects of many of the currently available pesticides is that, in spite of their general effectiveness, they are specifically without action or have very slight action against mites, for example, and other members of the class Arachnida. Also, in the art of controlling pests, the agents used must not only be effective in killing the pests or rendering them inactive but also must be without phytotoxic action on the host plants. This is very important since many compounds have been tested and found effective against pests but they also exhibit herbicidal activity. Such materials are of no economic value since the prime purpose in destroying the pest is to preserve the host.

An object of this invention is to provide improved pesticidal compositions. Another object of this invention is to provide compositions which are simple to use but are highly effective against the various pests, such as insects, mites, and fungi, which destroy plant life. Another object of this invention is to provide improved pesticidal compositions useful as tree sprays. Another object of this invention is to provide improved spray compositions which are highly effective against the European red mite, (*Paratetranychus pilosus*), red spider mite (*Tetranychus telarius*), citrus red mite (*Paratetranychus citri*), and the like. Another object of this invention is to provide an improved method for controlling or eliminating mites, such as red spider mites, European red mites, citrus mites, and the like. Other aspects, objects, as well as the several advantages of this invention are apparent from a study of the disclosure, the drawing and the appended claims.

In accordance with the present invention, specific pesticidal activity without phytotoxic effect is imparted to pesticidal compositions by dispersing a small proportion of a high-boiling sulfur-containing product which results from the production of alkyl mercaptans through the interaction of hydrogen sulfide and selected olefins, preferably, in the presence of a solid contact catalyst, in a carrier medium, such as an aqueous solution to form a stable emulsion of the sulfur-containing product therein. More specifically, in accordance with the present invention, I provide an effective emulsion spray for both deciduous and evergreen-type plantings, as well as citrus trees, having excellent pesticidal activity, containing as the active principal ingredient thereof the kettle product, which is normally a waste material, which results from the production of high-boiling alkyl mercaptans through the interaction of hydrogen sulfide and selected olefins in the presence of a solid contact catalyst.

In accordance with one specific embodiment of the present invention, I provide an effective emulsion spray having excellent pesticidal activity for protecting both deciduous and evergreen-type plantings, as well as citrus trees, against mites, insects, and fungi, by way of example, containing as the active principal ingredient thereof the kettle bottoms product obtained during the synthesis of tert. dodecyl mercaptan (Sulfole) by the interaction of selected olefins, especially, a fraction comprised mainly of $C_{12}$ olefins having principally the tertiary configuration, and hydrogen sulfide in the presence of a solid contact catalyst, such as, for example, the ordinarily solid adsorbent-type catalysts, such as natural or activated clays, silica gel, charcoal, and the metallic sulfides.

The physical properties of this material as well as mercaptan and total sulfur content and molecular weight are shown in the specific example. The boiling range, mercaptan content, and total sulfur content indicate that the principal active ingredient of the present invention is a mixture of dodecyl mercaptan and heavy dialkyl disulfides. The distillation range of the kettle product ranges from about 166° to about 378° F. at 1 mm. Hg distillation pressure. Analyses of the kettle product indicate that it is comprised of a mixture of tertiary dodecyl mercaptan and heavy dialkyl sulfides. The heavy sulfides are believed to be comprised of a mixture of didodecyl disulfide together with other dialkyl mono-, di- and polysulfides in small amounts. I have found that an oil emulsion spray comprising as the active ingredient thereof the mercaptan tower kettle product obtained during the synthesis of tertiary dodecyl mercaptan exhibits excellent activity for the control of the mites, insects, and fungi attacking both deciduous and evergreen-type plants, and there was little or no apparent damage by the emulsion spray to the plant foliage. The effectiveness of the spray for the control of the European red mite on Chinese elm trees was found, during these tests, to be almost spectacular.

The normally waste mercaptan tower kettle product employed in the practice of my invention, which is obtained during the synthesis of tertiary dodecyl mercaptan, imparts specific pesticidal activity when dispersed in aqueous solutions. The extender that is used is preferably water. When dispersed in an aqueous solution, two suspending, wetting or emulsifying agents, such as an alkylated aryl polyether alcohol (Triton X–100) and a sodium salt of an alkyl aryl polyether sulfate (Triton X–301) are advantageously employed. Substantially any emulsifier or surfactant may be used to hold the dodecyl mercaptan tower kettle product in suspension although the two above-described emulsifying agents are particularly effective and this is an important feature of the present invention. One of the emulsifying agents that I use exhibits an affinity for oil, while the other exhibits an affinity for water. The pesticidal concentrate, preferably contains from about 3 percent to about 15 percent by weight of surfactants based on the total weight of the concentrate. In the practice of the present invention, the ratio of Triton X-100 type to X-301 type surfactant, for example, is not critical and ratios within the range of 1:1 up to 10:1 may be advantageously employed to produce stable emulsions.

Typical ranges of the ingredients that I can use to prepare a concentrate according to the invention comprises about 600 grams of tertiary dodecyl mercaptan tower kettle product, 25-100 grams Triton X-100 type surfactant, 5-50 grams Triton X-301 type surfactant, and sufficient water to make a total volume of one quart concentrate, usually approximately 100-200 grams. A concentrate of the present invention may contain as much as 70, or more, weight percent of tertiary dodecyl mercaptan tower kettle product. A very effective concentrate that I have prepared and used according to the present invention comprised 600 grams of kettle product, 28 grams Triton X-100 type sulfactant, 7 grams Triton X-301 type surfactant and sufficient water to make a total volume of one quart of concentrate, which required approximately 200 grams water. The strength of the spray that can be employed according to the present invention may vary considerably and a summer strength recipe that I used on Chinese elm trees, for example, to effectively combat the European red mite, for example, was made up by adding one quart of the concentrate to 150 gallons of water; however, when using the spray of the present invention on trees or shrubs in the dormant state, a spray strength of as much as 10, or more, times as strong as the summer strength recipe can be safely and advantageously employed. Therefore, the proportion of pesticidal agent, i.e., mercaptan tower kettle product, employed in the compositions of my invention is very small, of the order of about 0.1 to 1, or more, weight percent, depending upon the strength of the spray solution employed. The mercaptan tower kettle product containing solutions of the present invention may be applied in the conventional way as by spraying. The spray composition of the present invention may also contain other miticidal, insecticidal, and fungicidal agents, if desired.

The dodecyl mercaptan kettle tower product used in the present invention may be prepared by the methods disclosed in U.S. patent of Walter A. Schulze, No. 2,426,646, dated September 2, 1947, and Patent 2,392,555, dated January 8, 1946, and U.S. patent of Paul F. Warner, No. 2,592,089, dated April 8, 1952.

The kettle product utilized in the practice of the present invention is preferably produced during the synthesis of tertiary dodecyl mercaptans (sulfole) by the interaction of selected olefins and hydrogen sulfide in the presence of a suitable catalyst. The olefin feed stock preferably utilized is obtained from the polymerization of propylene and is that portion of the polymer product which boils in the range of about 345° F. to about 370° F. This fraction is comprised mainly of $C_{12}$ olefins having principally the tertiary configuration. The hydrogen sulfide may also be derived from any convenient source. Hydrogen sulfide is particularly abundant as a by-product from petroleum refining processes and from natural gasoline treating plants. Pure hydrogen sulfide, while often desirable, is not essential to the successful operation of this invention. The specific type of catalyst employed is preferably Filtrol Grade 71, which is principally a clay-type material commonly utilized as an adsorbent. However, other types of solid contact-type catalysts that can be employed include metallic sulfides, fuller's earth, silica gel, charcoal, and the like. The process of recovering the high-boiling mercaptans and the desired kettle product from the catalyst effluent comprises a stabilization operation for the recovery of unreacted hydrogen sulfide, a stripping operation for the removal of unreacted olefin and/or hydrocarbon impurities and finally a flash distillation of mercaptan and kettle product. Stripping and flash distillation operations may be carried out as diminished pressure operations as ordinarily carried out with vacuum pumps or with steam. Other methods of separating mercaptan product and kettle product from unreacted olefin and other material, especially solvent extraction, may be employed if desired.

A better understanding of the present invention may be obtained upon reference to the accompanying schematic flow diagram showing a generally preferred method of producing and recovering the mercaptan tower kettle product employed in the pesticidal compositions of the present invention.

Hydrogen sulfide introduced by line 10, olefin feed stock via line 11, and recycle olefin via line 12 are passed through line 13 into preheater 14 to preheat the feed material to a temperature of about 190° F. and then passed through conduit 15 and introduced into catalyst case 16. The olefin feed stock introduced through conduit 11 was obtained from the polymerization of propylene and is that portion of the polymer product which is recovered in the range of about 345° F. to about 370° F., which is comprised mainly of tertiary $C_{12}$ olefins. The catalyst preferably employed in catalyst chamber 16 is Filtrol Grade 71. The temperature normally employed in the catalyst chamber utilizing the preferred catalyst ranges from about 230° F. to 250° F. while the pressure employed in the catalyst case is about 800 p.s.i.g. The reaction mixture removed from catalyst case 16 is passed through conduit 17 and introduced into high pressure stripper 18, wherein hydrogen sulfide is removed overhead via line 19. High pressure stripper 18 is preferably operated at a temperature slightly above the reaction temperature utilized in catalyst case 16, preferably of the order of about 245° F. to about 255° F., and at a pressure of about 43 p.s.i.g. The reaction product, which is partially denuded of $H_2S$, is removed from high pressure stripper 18 through conduit 20 and passed to low pressure stripper 21, which is operated at a temperature of about 235° F. and at atmospheric pressure, to further remove any unreacted $H_2S$ remaining in the reaction mixture, which is removed overhead via line 22. The $H_2S$ denuded reaction product is removed from low pressure stripper 21 through conduit 23 and passed to polymer tower 24, which is preferably operated at a temperature of about 256° F. and at 5 mm. Hg pressure absolute, to remove unreacted olefin overhead through line 29. The unreacted olefin is removed directly from tower 24 through conduit 25 and part of it recycled to the lower portion of tower 24 through line 26, and the remainder of the unreacted olefin removed from tower 24 is passed through cooler 27 and part of the cooled unreacted olefin is returned to the upper portion of tower 24 through line 28 and the remainder removed through line 29 and recycled to the catalyst case 16. The olefin-free mercaptan is removed from polymer tower 24 through line 30, a part of this material being recycled to tower 24 through beater 31 and conduit 32, and the remainder of the olefin-free mercaptan is passed through line 33 to the mercaptan recovery tower 34. The mercaptan tower is preferably operated at a temperature of about 272° F. and 3 mm. Hg absolute pressure, to separate the dodecyl mercaptan overhead product from the heavy high-boiling kettle product material. The dodecyl mercaptan product is removed from tower 34 through line 35, a part of the mercaptan being recycled to the lower portion of the tower via line 36, and the remainder being passed through cooler 37, a part being reintroduced into the tower through line 38, and the remainder of the mercaptan product removed overhead via line 39. The heavy high-boiling kettle product is removed from the mercaptan tower through line 40, a part being recycled through heater 41 and conduit 42 and introduced back into tower 34, while the remainder of the kettle material is removed through conduit 43 as the heavy kettle product, which I use as the principal active pesticidal ingredient of my invention.

The final product recovered overhead through line 39, the dodecyl mercaptan, had the following characteristics:

| | |
|---|---|
| Purity | 95 weight percent minimum. |
| Weight percent mercaptan sulfur | 15 weight percent minimum. |
| Molecular weight | 200±4. |
| API gravity | 31.1 to 34.0. |
| 5 mm. Hg distillation | 179° F. minimum, 225° F. maximum. |

The heavy high-boiling kettle product recovered in line 43 in one run had the following characteristics:

| | |
|---|---|
| Refractive index, 20/D | 1.4959 |
| Specific gravity, 20/4 C | 0.8769 |
| Molecular weight | 261 |
| Mercaptan sulfur, wt. percent | 7.8 |
| Total sulfur, wt. percent | 14.6 |
| 5 mm. Hg distillation, degrees F.: | |
| IBP | 217 |
| 5% | 228 |
| 10% | 236 |
| 20% | 265 |
| 30% | 312 |
| 40% | 339 |
| 50% | (1) |
| 60% | ---- |
| 70% | ---- |
| 80% | ---- |
| 90% | ---- |
| 95% | ---- |
| DP | ---- |

[1] Cracked-distillation discontinued.

In another run the high-boiling kettle product had the following characteristics:

| | |
|---|---|
| Refractive index, 20/D | 1.4851 |
| Specific gravity, 20/20 | 0.8965 |
| Mercaptan sulfur, wt. percent | 3.87 |
| Total sulfur wt. percent | 14.82 |
| Molecular weight | 320 |
| 1 mm. Hg distillation, degrees F.: | |
| IBP | 166 |
| 5% | 184 |
| 10% | 198 |
| 20% | 228 |
| 30% | 288 |
| 40% | 316 |
| 50% | 333 |
| 60% | 347 |
| 70% | 358 |
| 80% | 370 |
| 90% | 378 |
| 95% | (1) |

[1] Cracked.

The physical properties of the kettle product will depend in part upon the relative proportion of mercaptan and dialkyl sulfides contained therein. Broadly, the mercaptan content of this material usually ranges from about 20 to about 60 percent by weight, the remainder consisting essentially of dialkyl sulfides, chiefly dialkyl disulfides, as mentioned hereinabove.

The relative proportions of mercaptan to dialkyl sulfides in the kettle product will depend upon the reaction conditions employed in the mercaptan synthesis step and upon the operating conditions in the mercaptan tower 34. Thus, the proportion of mercaptan in the synthesis product becomes less, and that of the high boiling dialkyl sulfides greater, as the temperature in catalyst chamber 16 is increased. Also, the extent to which the removal of mercaptan product from kettle product is effected in tower 34 will depend upon the separating efficiency of the tower and the conditions of temperature and pressure employed therein.

Olefin feedstocks, other than the $C_{12}$ olefins described hereinabove, which can be used in the preparation of the high-boiling kettle product of my invention, include those having from about 8 to about 20 carbon atoms per molecule, although olefins outside this range can be used. Olefins having from about 12 to about 16 carbon atoms are presently preferred. The olefins can be normal (straight chain) olefins or they can be of the branched configuration, and the double bond can be in any position in the molecule.

The usefulness of the new compositions of my invention and of the general method of application will be illustrated in the following examples:

*Example 1*

A concentrated spray solution was prepared by mixing together the following ingredients:

| Ingredient | Weight, Grams |
|---|---|
| Kettle product | 600 |
| Triton X-100 | 28 |
| Triton X-301 | 7 |
| Water | (1) |

[1] Amount needed to make total volume of 1 quart (200).

The Triton X-100 type and Triton X-301 type surfactants are manufactured by Rohm and Haas and were added to stabilize the oil-in-water type emulsion.

The mercaptan kettle product utilized in the concentrated spray solution was produced, as previously described with the accompanying flow diagram, i.e., during the synthesis of dodecyl mercaptans from $C_{12}$ olefins having principally the tertiary configuration, obtained as a portion of the product recovered in the range of about 345° F. to about 370° F. from a $C_3$ polymerization process, and $H_2S$ in the presence of Filtrol Grade 71 catalyst and carried out within the temperature range of about 230° F. to about 250° F. and at about 800 p.s.i.g. pressure.

Characteristics of the mercaptan tower kettle product employed were as follows:

| | |
|---|---|
| Refractive index, 20/D | 1.4959 |
| Specific gravity, 20/4 C | 0.8769 |
| Molecular weight | 261 |
| Mercaptan sulfur, wt. percent | 7.8 |
| Total sulfur, wt. percent | 14.6 |
| 5 mm. Hg distillation, degrees F.: | |
| IBP | 217 |
| 5% | 228 |
| 10% | 236 |
| 20% | 265 |
| 30% | 312 |
| 40% | 339 |
| 50% | (1) |
| 60% | --- |
| 70% | --- |
| 80% | --- |
| 90% | --- |
| 95% | --- |
| DP | --- |

[1] Cracked—distillation discontinued.

Diluted spray solution to be used on the trees was prepared by adding one quart of the above-concentrated composition to 150 gallons of water. The diluted spray solution contained about 0.1 weight percent mercaptan tower kettle product.

Chinese elm trees badly infected with European red mites were sprayed during the summer months, but only after a considerable amount of damage had been inflicted to the leaves by the mites, with the above-described diluted solution. The solution was sprayed on the trees until the solution dripped off the leaves. Very few of the mites were able to migrate to new leaves, indicating that a high degree of control was obtained. Approximately three weeks after the spraying, it was observed that bright green leaves appeared on the ends of the fronds, showing that healthy new growth had occurred after the spray had taken effect. There was little or no apparent damage to the plant foliage by the spray employed. Also, the trees at this time were substantially free of the red mites.

Other Chinese elm trees, which had not been sprayed by the composition of the present invention, were attacked in the middle of the summer with European red mites and lost all or nearly all their leaves within a period of about six weeks, indicating the degree of infestation of the trees.

Thus, it can be seen from the above example that the spray composition of the present invention is particularly valuable in its combination of pesticidal activity without phytotoxic action.

*Example II*

A tree spray solution was prepared as in Example I and was field tested on both deciduous and evergreen-type plantings infested with red-spider mites and other pests. The trees were sprayed with the dilute solution until the solution dripped off the leaves. The spray controlled the red spider mites, as well as the European red mites attacking the plants, and it was observed that there was little or no apparent damage to the plant foliage by the spray. Also, very few of the insects were able to migrate to new leaves, indicating that a high degree of control was obtained.

The pesticidal composition of the present invention is particularly valuable in its combination of miticidal activity without phytotoxic action, as demonstrated by the above example.

*Example III*

A spray solution prepared as in Example I was applied to Amur privet (South) plants which were infested with whiteflies. The whiteflies were killed, with no apparent injury to the plants.

In addition to the specific examples given above, the compositions of my invention are useful in the control of many other pests. Thus, they can be used against aphids, powdery mildew, rusts, and other pests.

As will be evident to those skilled in the art, various modifications of this invention can be made or followed in the light of the foregoing disclosure and discussion without departing from the spirit or scope of the disclosure or the scope of the appended claims.

I claim:

1. A method of controlling plant insects which comprises applying to plants infested with said insects an insecticidal amount of a dispersion of a high-boiling organic sulfur-containing normally waste material having a total sulfur content of not more than 15 weight percent and a mercaptain content of approximately 50 weight percent, said sulfur content comprising a mixture of tertiary dodecyl mercaptan and heavy alkyl sulfides, said heavy sulfides comprising principally didodecyl disulfide, in an aqueous carrier medium which contains from about 3 to about 15 weight percent of an emulsifying agent, said sulfur-containing material having been prepared by the interaction of an olefin hydrocarbon fraction having a boiling range of about 345° F. to about 370° F. and comprised principally of olefins having from about 8 to 20 carbon atoms per molecule and hydrogen sulfide in the presence of a solid clay-type catalyst within a temperature range of about 230° F. to 250° F. and at about 800 p.s.i.g. pressure, and fractionally distilling the reaction product from said process to recover said high-boiling sulfur-containing material as kettle product for use in the method.

2. A method of controlling mites which comprises applying to plants infested with said mites, a miticidal amount of a dispersion of a high-boiling organic sulfur-containing kettle product material having a total sulfur content of not more than 15 weight percent and a dodecyl mercaptan content of about 53 weight percent, in an aqueous carrier medium containing an emulsifying agent, said sulfur-containing kettle product material having been prepared by the interaction of a tertiary $C_{12}$ olefin hydrocarbon-containing fraction boiling within the range of about 345° F. and 370° F. and hydrogen sulfide in the presence of a solid clay-type contact catalyst within a temperature range of about 230° F. to 250° F. and at about 800 p.s.i.g. pressure, and fractionally distilling the reaction product for use in the method to recover said high-boiling kettle product.

3. A method of protecting a plant against attack by mites which comprises applying to said plant a miticidal amount of an aqueous spray which comprises a mixture containing as the principal active ingredient thereof a high molecular weight organic sulfur-containing material having a sulfur content of about 15 weight percent and a mercaptan content of about 50 weight percent, said material having been recovered as the kettle product resulting from the interaction of a tertiary $C_{12}$ olefin hydrocarbon-containing fraction boiling not lower than about 345° F. and not higher than about 370° F. and $H_2S$ in the presence of a solid contact adsorbent-type catalyst at a temperature in a range of about 230° F. to about 250° F. and at about 800 p.s.i.g. pressure, a minor amount of an emulsifying agent, and water.

4. An insecticidal composition for use as a plant spray comprising an aqueous carrier medium, an emulsifying agent and as the principal active ingredient thereof a high-boiling organic sulfur-containing kettle product material having a total sulfur content of not more than 15 weight percent, and a dodecyl mercaptan content of about 53 weight percent, said sulfur-containing kettle product material having been prepared by the interaction of a tertiary $C_{12}$ olefin hydrocarbon fraction boiling within the range of about 345° F. and 370° F. and hydrogen sulfide in the presence of a solid clay-type contact catalyst within a temperature range of about 230° F. to 250° F. and at about 800 p.s.i.g. pressure, and fractionally distilling the reaction product for use in the composition to recover said high-boiling kettle product.

5. A composition effective for the killing of plant pests which comprises a mixture of a high molecular weight organic sulfur-containing material comprised of about equal parts of tertiary dodecyl mercaptan and heavy dialkyl sulfides, said material having been recovered as 0.1 to 1 weight percent of the kettle product resulting from the interaction of a $C_{12}$ tertiary olefin hydrocarbon fraction boiling in the range of about 345° F. to about 370° F. and $H_2S$ in the presence of a solid contact catalyst at a temperature within range of 230° F. to 250° F., at about 800 p.s.i.g. pressure, and an aqueous liquid carried medium containing an emulsifying agent.

References Cited in the file of this patent

UNITED STATES PATENTS

| | | |
|---|---|---|
| 1,986,218 | Remy | Jan. 1, 1935 |
| 2,392,554 | Schulze | Jan. 8, 1946 |
| 2,426,646 | Schulze | Sept. 2, 1947 |
| 2,592,089 | Warner | Apr. 8, 1952 |

OTHER REFERENCES

Roark: A List of Organic Sulphur Compounds, May 1935, E-344, pp. 8-27.